United States Patent
de Fontenay (10) Patent No.: US 6,412,762 B2
(45) Date of Patent: Jul. 2, 2002

(54) SUSPENSION JOINT AND TORSION SPRING ASSEMBLY

(75) Inventor: Etienne de Fontenay, Decize (FR)

(73) Assignee: Compagnie Generale des Etablissements Michelin-Micheline & Cie, Clermont-Ferrand (FR)

( * ) Notice: Subject to any disclaimer, the term of this patent is extended or adjusted under 35 U.S.C. 154(b) by 0 days.

(21) Appl. No.: 09/738,303

(22) Filed: Dec. 15, 2000

Related U.S. Application Data (63) Continuation of application No. PCT/FR00/00962, filed on Apr. 14, 2000.

(30) Foreign Application Priority Data

Apr. 16, 1999 (FR) .............................................. 99 04793

(51) Int. Cl.[7] .............................................. B60G 11/22
(52) U.S. Cl. ........................ 267/279; 267/273; 267/293
(58) Field of Search ................................ 267/279, 189, 267/282, 293, 152, 153, 273, 276, 141.2, 141.3; 248/609; 305/42

(56) References Cited

U.S. PATENT DOCUMENTS

| | | | | |
|---|---|---|---|---|
| 2,690,335 A | * | 9/1954 | Ballard | ........................ 267/279 |
| 2,951,710 A | | 9/1960 | Willetts | |
| 3,121,560 A | | 2/1964 | Reed | |
| 3,462,136 A | * | 8/1969 | Rumsey | ........................ 267/279 |
| 3,467,421 A | * | 9/1969 | Bentley | ........................ 267/279 |
| 3,913,692 A | | 10/1975 | Lohr et al. | |
| 3,930,550 A | | 1/1976 | Rose et al. | |
| 4,087,103 A | * | 5/1978 | Smith | ........................ 280/96.1 |
| 4,714,220 A | | 12/1987 | Hillstrom et al. | |
| 4,768,761 A | * | 9/1988 | Kramer | ........................ 267/154 |
| 4,834,351 A | * | 5/1989 | Freudenberg et al. | ..... 267/140.1 |
| 5,328,196 A | * | 7/1994 | Ohma | ........................ 280/276 |

FOREIGN PATENT DOCUMENTS

| | | | |
|---|---|---|---|
| DE | 1580358 | | 1/1970 |
| DE | 1630901 | | 2/1971 |
| DE | 2723497 | | 12/1978 |
| EP | 475537 | | 3/1992 |
| FR | 2517606 | | 6/1983 |
| JP | 36105081 A | * | 3/1986 |
| JP | 36107492 A | * | 4/1986 |
| JP | 404345510 A | * | 12/1992 |

* cited by examiner

*Primary Examiner*—Christopher P. Schwartz
*Assistant Examiner*—Xuan Lan Nguyen
(74) *Attorney, Agent, or Firm*—Baker Botts L.L.P.

(57) ABSTRACT

An element forming a suspension joint and torsion spring, characterized in that it comprises an outer tubular sub-frame, an inner tubular sub-frame and an intermediate connecting sleeve made from an elastomer material which is joined without any possible slippage of the outer and inner sub-frames; said elastomer sleeve comprises at least two cell structures extending along the circumference thereof, whereby the radial rigidity of the joint is reduced in a significant manner in at least a number of directions without significantly reducing the torsional rigidity thereof.

23 Claims, 5 Drawing Sheets

SUSPENSION JOINT AND TORSION SPRING ASSEMBLY

CROSS REFERENCE TO RELATED APPLICATIONS

This application is a continuation application of international application Ser. No. PCT/FR00/00962, filed on Apr. 14, 2000, which international application was published by the International Bureau in French on Oct. 26, 2000 as WO 00/63032, which claims priority to French application Ser. No. 99/04,793 filed Apr. 16, 1999.

BACKGROUND OF THE INVENTION

The invention relates to a suspension joint and torsion spring assembly capable of working in torsion and in compression/tension and intended to be installed between two members capable of limited relative rotation about an axis of rotation and of limited relative displacement in at least one radial direction.

The assembly which is the subject of the invention is of the type which comprises an outer shell capable of being secured to one of the members, an inner shell capable of being secured to the other member, and a coupling sleeve made of elastomer, wherein the sleeve is secured with no possibility to slide to the inner and outer shells.

The invention relates more particularly, although not exclusively, to a suspension joint and torsion spring assembly for a vehicle, it being possible for one of the members to consist of a tubular crossbeam and for the other member to consist of a suspension arm.

An assembly of this type is known, for example, from German Patent No. DE-A-1,580,358. The outer shell is formed of a tube extending across the entire width of the vehicle while the inner shell consists of a tube of smaller diameter and shorter length provided on each side of the vehicle. Elastomeric coupling means arranged between the tubes are separated axially from one another for the passage of pins which anchor the inner shell of the joint to one of the members. The axial bulk of the joint, for given stiffness properties, is relatively large. Furthermore, manufacturing of such a joint is cumbersome and its structure does not allow quick and easy modifications to adapt the torsional and radial stiffness properties.

German Patent No. DE-A1-2,723,497 belonging to the same applicant describes practically the same thing and has the same drawbacks.

U.S. Pat. No. 3,121,560 describes a suspension consisting of two concentric tubes placed one inside the other and coupled one to the other by an elastomeric material, this unit being intended to constitute a suspension working in the axial direction of the two concentric tubes.

U.S. Pat. No. 3,930,550 describes a torsion bar, the movements of which are countered by a resilient system consisting of elastomer placed between two concentric tubes. This resilient system only holds against torsion and has no particular property regarding its radial resistance.

SUMMARY OF THE INVENTION

The object of the invention is, above all, to provide a suspension joint and torsion spring assembly of the above-defined type which offers great manufacturing flexibility and allows the stiffness properties to be adapted easily. It is also desirable for this assembly to make it possible, for a given torsional spring rate, to obtain a relatively small radial spring rate, particularly to improve the vibrational and acoustic comfort of a wheelset of a vehicle in contact with the ground.

According to a first embodiment of the invention, the suspension joint and torsion spring assembly comprises an outer tubular subshell, an inner tubular subshell and an intermediate coupling sleeve made of elastomer, wherein the sleeve is secured with no possibility to slide to the outer and inner subshells; said elastomeric sleeve comprising at least two cells; so that the radial spring rate of the joint is significantly reduced in at least some directions without its torsional spring rate being significantly reduced.

Each cell may extend over all or part of the circumference of the sleeve.

Said sleeve may comprise a number of cells arranged parallel to one another along the longitudinal axis of the suspension.

The cells may be arranged in pairs, symmetrically with respect to the longitudinal axis of the suspension, so as to form two arcs of a circle, the angle of which can vary between 30° and 120°, which makes it possible to determine the amount of lessening of the radial spring rate as desired.

The cells preferably have a generally trapezoidal cross section with rounded corners, the large base being located on the outer subshell.

According to a second embodiment of the invention, the suspension joint and torsion spring assembly of the above-defined type is characterized in that it comprises at least two basic elements working in parallel, each basic element comprising an outer subshell, an inner subshell and an intermediate coupling sleeve made of elastomer, wherein the sleeve is secured with no possibility to slide to the outer and inner subshells, at least one flank of which has a concave portion on at least part of its circumference, the basic elements being arranged end to end so that the outer shell and the inner shell are formed respectively by a succession of independent and adjacent subshells, while the concave portions of the flanks form at least one cell in the elastomer by virtue of which, for a given torsional rigidity of the joint, the radial rigidity is lessened with a small axial bulk.

As a preference, a concave portion is provided on each flank of the intermediate coupling sleeve made of elastomer.

The concave portion provided on one or each flank of the coupling sleeve may extend around the entire circumference; in this case, there is no angular indexing imposed when fitting the basic element, the radial rigidity being substantially constant regardless of the polar angle.

According to another possibility, the concave portion provided on one or each flank of the coupling sleeve extends over just part of the circumference, and the successive basic elements of a suspension joint have the same angular orientation so that the concave portions are side by side as are the continuous parts of the flanks. The radial rigidity of such a joint may thus vary as a function of the polar angle of the radial direction in question.

In particular, there is a radial direction in which the radial spring rate is at a maximum, the radial spring rate being at a minimum in the direction perpendicular to the previous direction.

In general, the outer subshell and the inner subshell of each basic element is made of metal and the intermediate coupling sleeve made of elastomer is bonded on its outside and on its inside to the outer subshell and to the inner subshell, respectively.

The suspension joint and torsion spring assembly may, for example, comprise four or eight basic elements placed end to end.

The torsional spring rate may be of the order of 34 mN per degree of angle. The radial spring rate may be of the order of 4 kN/mm.

Thus, the assembly according to the invention makes it possible to obtain a significant reduction in the radial spring rate, at least in certain directions, without a significant reduction in the torsional spring rate. Inevitably, the torsional spring rate will decrease if cells are introduced, even if these are only local. However, in any event, the radial spring rate/torsional spring rate ratio becomes smaller.

Apart from the arrangements explained hereinabove, the invention consists in a certain number of other arrangements which will be discussed more fully hereinafter with regard to some exemplary embodiments which are described with reference to the appended drawings, but which are by no way restrictive.

DESCRIPTION OF THE PREFERRED EMBODIMENTS

Figure 1:
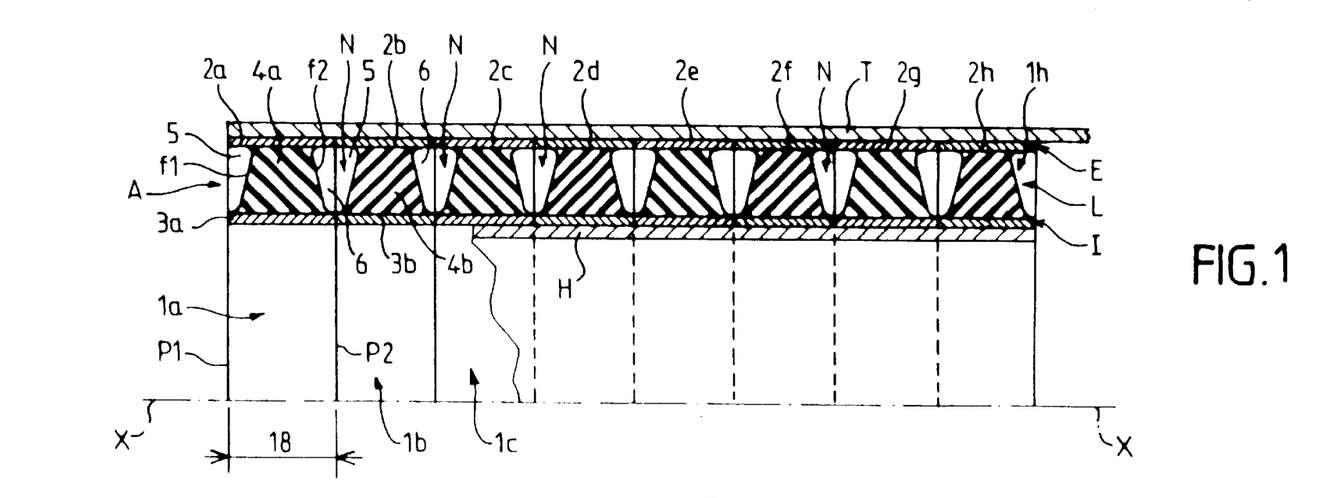
FIG. 1 is a vertical sectional half-view of a suspension joint and torsion spring assembly according to the invention.
Figure 2:
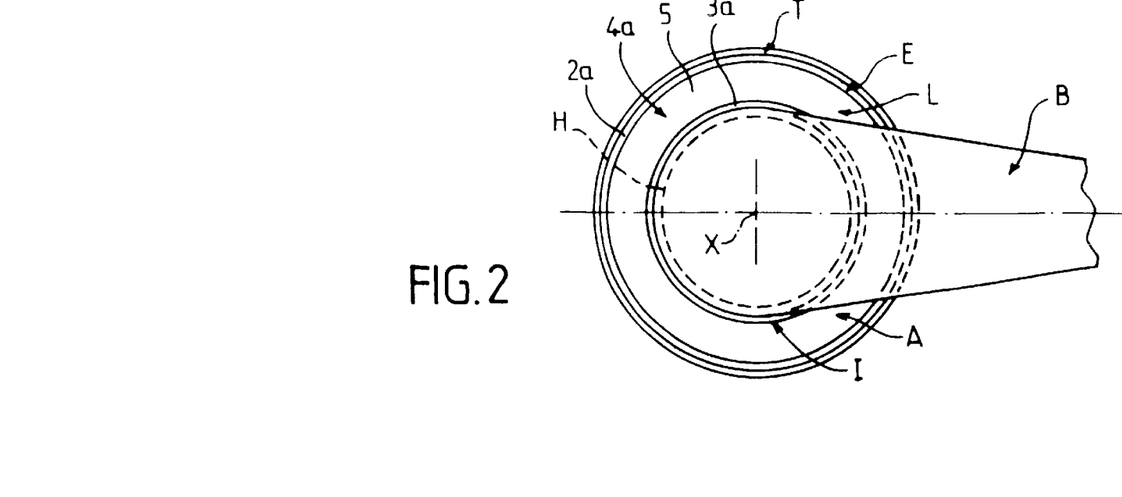
FIG. 2 is a side view from the left of FIG. 1.

Reference is made to FIGS. 1 and 2 which show a suspension joint and torsion spring assembly installed between two members, namely a tubular crossbeam T and a wheel suspension arm B. The arm B can effect a rotational movement of limited amplitude about the geometric axis X—X of the crossbeam T. This arm B is secured to a hollow shaft H engaged coaxially in the crossbeam T and orthogonal to the part of the arm B located on the outside of the crossbeam T and oriented in a substantially longitudinal direction.

The suspension joint assembly A is capable of working in torsion under the effect of the limited oscillatory movements of the arm B and in compression/tension following limited displacements of the shaft H in at least one radial direction, particularly a horizontal and a vertical direction.

The joint assembly A comprises an outer shell E anchored to the crossbeam T and a tubular coaxial inner shell I anchored to the shaft H engaged in this shell I. A coupling sleeve L made of elastomer is provided between the outer shell E and the inner shell I.

According to a non-limiting embodiment of the invention, the joint assembly A comprises at least two basic elements 1a, 1b working in parallel. In the example illustrated in FIG. 1, the joint assembly A comprises eight identical basic elements illustrated at 1a to 1h. The description of the element 1a will therefore apply to all the basic elements.

The basic element 1a comprises an outer subshell 2a made of metal, a coaxial inner subshell 3a made of metal and an intermediate coupling sleeve 4a made of elastomer.

The intermediate sleeve 4a has two flanks f1, f2. At least one flank and preferably both flanks f1, f2 have a concave portion 5, 6. The expression "concave portion" is to be understood as meaning an empty space set back from a plane P1, P2 orthogonal to the geometric axis of the basic element 1a in question and resting against the end edges of the subshells 2a and 3a. The elastomer of the sleeve 4a is continuous between the flanks f1, f2.

The basic elements 1a to 1h are placed end to end, coaxially. Each outer subshell 2a to 2h is anchored individually to the crossbeam T. Likewise, the inner subshells 3a to 3h are anchored individually to the shaft H. The intermediate sleeves 4a to 4h remain independent of one another.

The outer shell E and the inner shell I are thus formed of a succession of juxtaposed subshells.

The concave portions 5, 6 of the flanks f1, f2 are provided around the entire circumference. When they are juxtaposed, the concave portion 6 of a right-hand flank faces the concave portion 5 of the left-hand flank of another basic element located to its right. Thus cells N which have symmetry of revolution about the axis X—X are formed, these being located axially between the sleeves 4a to 4h made of elastomer. The configuration described corresponds to the state of rest of the joint.

The presence of these cells N makes it possible, in the event of radial compression in a zone, for the elastomer of the sleeves 4a to 4h to deform relatively freely so that the radial rigidity in the direction in question is lowered.

According to the embodiment of FIGS. 1 and 2, as the cells N have symmetry of revolution about the axis X—X, the radial rigidity is substantially constant regardless of the polar angle of the radial direction in question.

A coupling joint of the same axial length as the joint and torsion spring assembly illustrated in FIG. 1 but made up of a single outer shell extending along the entire length, of a single inner shell extending along the entire length, and of a single continuous sleeve made of elastomer also extending along the entire length would have far greater radial rigidity. To a first approximation, it can be said that the radial rigidity is proportional to the square of the axial length of the intermediate elastomeric sleeve. Because the basic elements 1a to 1h work in parallel, the elemental spring rates can be added. The radial spring rate of the unit, which is equal to the sum of the individual radial spring rates of each basic element will therefore be markedly lower than the radial spring rate of a joint made in a single unit with the same length as the combination of the eight basic elements.

The torsional spring rate, on the other hand, is substantially proportional to the axial length of the basic element, and more particularly to that of the elastomeric intermediate sleeve 4a to 4h. The cavities 5, 6 have little influence over this torsional spring rate, particularly when the intermediate sleeve 4a at its smallest diameter and at its largest diameter has an axial length substantially equal to that of the lower or upper subshell 3a, 2a to which it is secured, for example by adhesive bonding. Thus, the torsional spring rate of the set of eight basic elements illustrated in FIG. 1 is substantially equal to the torsional spring rate of a one-piece coupling joint whose intermediate elastomeric sleeve is continuous and not quite as long as the unit.

Of course, the example given with eight basic elements making up the suspension joint and torsion spring assembly is not restrictive to eight but may include any number of basic elements from one or more.

Starting out with a basic element 1a of given torsional spring rate, in order to achieve a target torsional spring rate for the suspension joint and torsion spring assembly, all that is required is for as many basic elements as necessary to be placed in parallel.

As the outer 2a to 2h and inner 3a to 3h metal subshells bear axially against one another, the axial length of a joint assembly consisting of a set of basic elements, for a given torsional spring rate, is not much different from a joint assembly made with an outer shell and an inner shell in a single unit. By contrast, according to the invention, the radial spring rate is lower.

By way of a non-restrictive numerical example, the torsional spring rate of a suspension joint and torsion spring assembly for a vehicle may be about 34 mN per degree of angle. This torsional spring rate, in the case of a conventional joint made up of a single outer shell, of a single intermediate sleeve made of elastomer, and of a single inner shell, can be obtained for an average axial length of 107 mm. The radial spring rate is about 27 kN/mm.

According to the invention, by making such a suspension joint and torsion spring assembly using two basic elements of the same outer and inner diameters as the conventional joint, but whose average length is half of the total length, namely about 53.5 mm, the same torsional spring rate of about 34 mN per degree of angle is kept, but the radial spring rate is approximately halved.

When the joint assembly is made of four basic elements with the same outer and inner diameters as the conventional joint, but with an average length of one quarter of the total length, namely about 26.75 mm, the torsional spring rate of about 34 mN per degree of angle is kept, but the radial spring rate is of the order of 7.3 kN/mm, that is to say practically quartered.

Finally, when the joint assembly is made up of eight basic elements with the same outer and inner diameters as the conventional joint as illustrated in FIG. 1, each basic element having an average length of one eighth of the initial length, namely about 13.4 mm, the torsional spring rate of 34 mN per degree of angle is kept, but the radial spring rate is lowered to about 4 kN/mm, instead of the 27 kN/mm of the conventional continuous original assembly. The above-mentioned values are orders of magnitude which apply to joints with parallel flanks. A trapezoidal geometry, for example, will result in a few variations.

The profile of the cavities 5, 6 is not of prime importance in reducing the radial rigidity insofar as the cells N are formed to allow the elastomer to deform freely. However, the profile of the cavities 5, 6 does have an appreciable influence on the resistance to fatigue of the basic element. An optimized shape should therefore be ensured.

Figure 3:
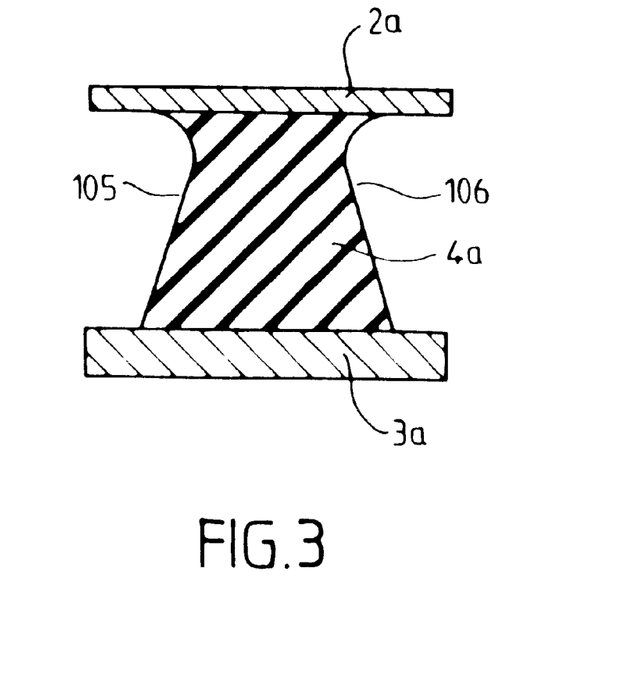
FIG. 3 is a sectional view along a diametral plane illustrating one possible profile for the flanks of the intermediate sleeve made of elastomer.

FIG. 3 shows cavities 105, 106 with a curved profile substantially with the shape of a hyperbolic arc, the focus of which is closer to the outer subshell 2a than to the inner subshell 3a.

Figure 4:
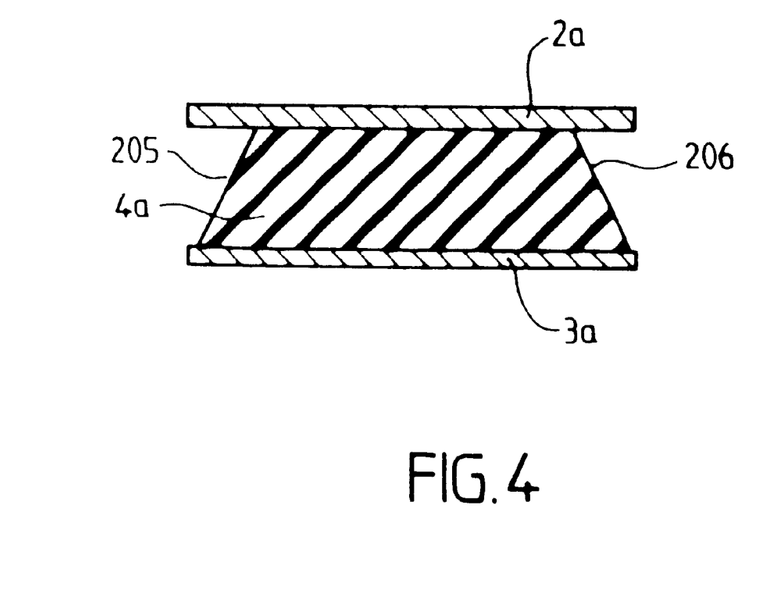
FIG. 4 shows, in a similar way to FIG. 3, an alternative profile of the flanks of the intermediate sleeve.

According to another advantageous possibility which is illustrated in FIG. 4, the radial section of the intermediate sleeve 4a made of elastomer has a trapezoidal shape defining cavities 205, 206, the radial section of which is an inclined segment of a straight line. The large base of the trapezoidal section is located on the inner subshell 3a.

Figures 5, 6, 7:
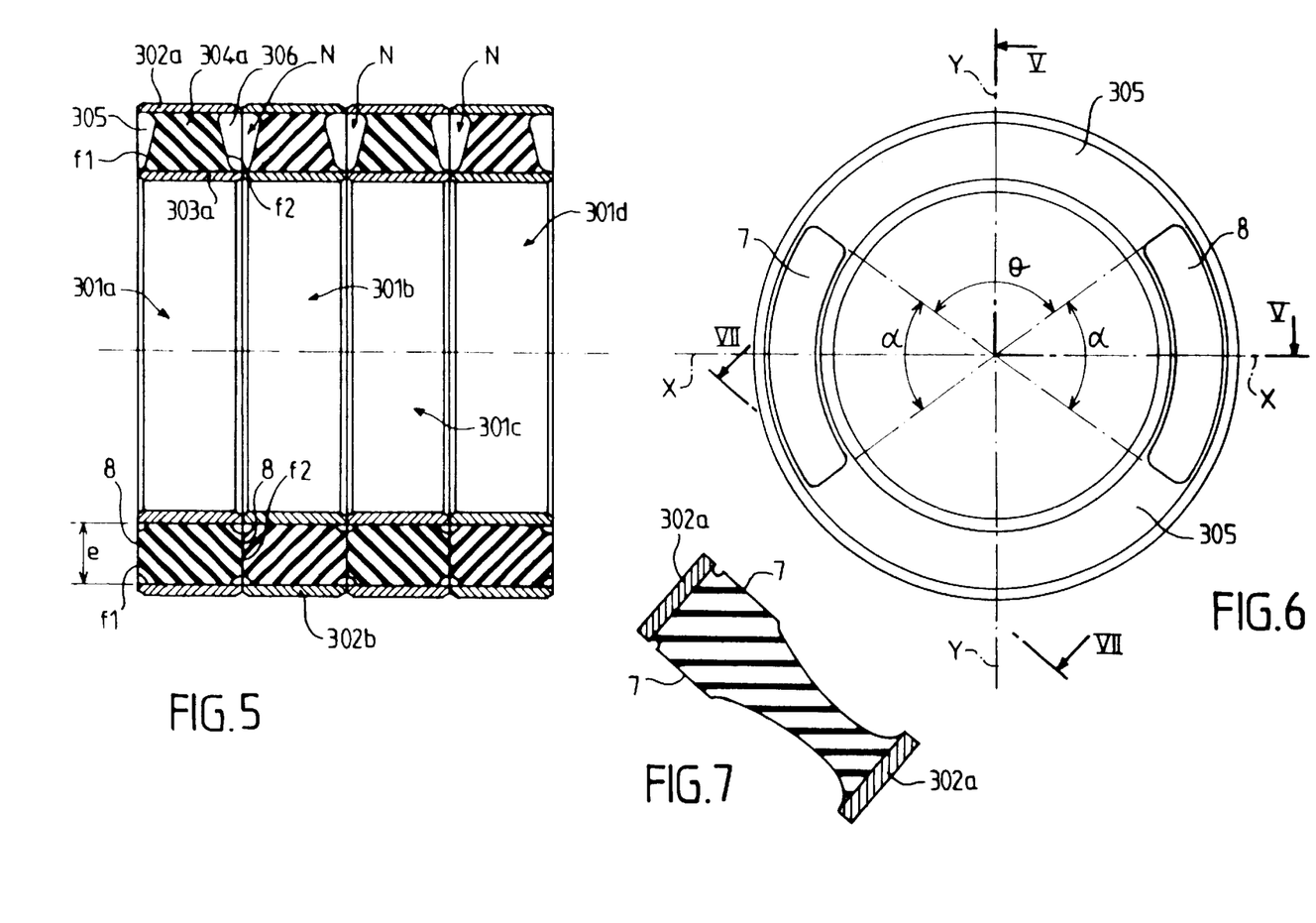
FIG. 5 depicts, in section along the broken line V—V of FIG. 6, an alternative form of embodiment of the joint assembly.
FIG. 6 is a side view from the left of the joint assembly in FIG. 5.
FIG. 7 is a sectional view along the line VII—VII of FIG. 6 of a basic element of the joint assembly.

FIGS. 5 to 7 illustrate an alternative form of embodiment where the application requires high radial spring rate in one polar direction or a given range of polar directions.

According to the embodiment depicted in FIG. 5, the suspension joint and torsion spring assembly consists of four basic elements 301a to 301d arranged to work in parallel. The parts which are identical or fulfil similar roles to parts already described with regard to FIGS. 1 and 2 are denoted by the sum of the number 300 and the numerical reference used in the preceding figures, without them being described again.

The difference between the alternative form of FIGS. 5 and 6 and that of FIGS. 1 and 2 lies in the fact that the intermediate sleeve 304a made of elastomer of the basic element 301a comprises, on each of its flanks, one or more recesses 305, 306 which extend over just part of its circumference. As visible in FIG. 6, two recesses 305 or 306 extend in two diametrically opposed arcs of the circumference, the angular extent θ of each arc being about 110°. This numerical value is not restrictive.

The two recessed arcs 305, which are symmetric with respect to the axis of the basic element of the joint assembly, are separated by two zones 7, 8 in which the elastomer is flush with the plane orthogonal to the axis of the basic element and resting against the axial ends of the subshells 302a, 303a. The zones 7, 8 extend over an angle α of about 70° in the depicted example.

The basic elements 301a to 301d are identical and they are mounted in an angularly indexed manner so that the zones 7, 8 of adjacent basic elements face one another, while the recessed flanks 305, 306 also face one another.

With such an arrangement, the radial rigidity in the mean direction of the zones 7, 8, that is to say in the direction X—X in FIG. 6, is markedly higher than in the radial direction Y—Y corresponding to the mean direction of the recessed flanks 305, 306.

The dimension of the zones 7 and 8 in the direction parallel to the axis of the basic element may be such that, under no radial load, the faces of the zone 7 and 8 are in contact, possibly with slight axial precompression. In this case, the radial rigidity in the direction X—X will be approximately linear.

It is also possible to provide a small clearance between the faces facing each other of the zones 7 and 8, in the absence of radial load, it being possible for this clearance to be approximately from 0.01 e to 0.1 e, e being the radial dimension (FIG. 5) of the zone 7, 8. In this case, the radial rigidity in the direction X—X is no longer linear. Relatively low at the onset of radial displacement, it becomes markedly higher thereafter.

In a suspension joint and torsion spring assembly according to the invention, the elastomer works under better conditions and its durability is improved.

The modular nature of the suspension joint and torsion spring assembly made up of juxtaposed basic elements allows it to easily come in a variety of forms for application in a range of vehicles with one manufacturer. The increase in torsional spring rate is obtained by adding one or more basic elements.

The small size of the basic elements allows small-sized molding presses to be used together with a small volume of injector.

It is also possible to reduce the spring rate spread of the suspension joint and torsion spring assembly by carefully choosing the mix of basic elements.

Figure 8:
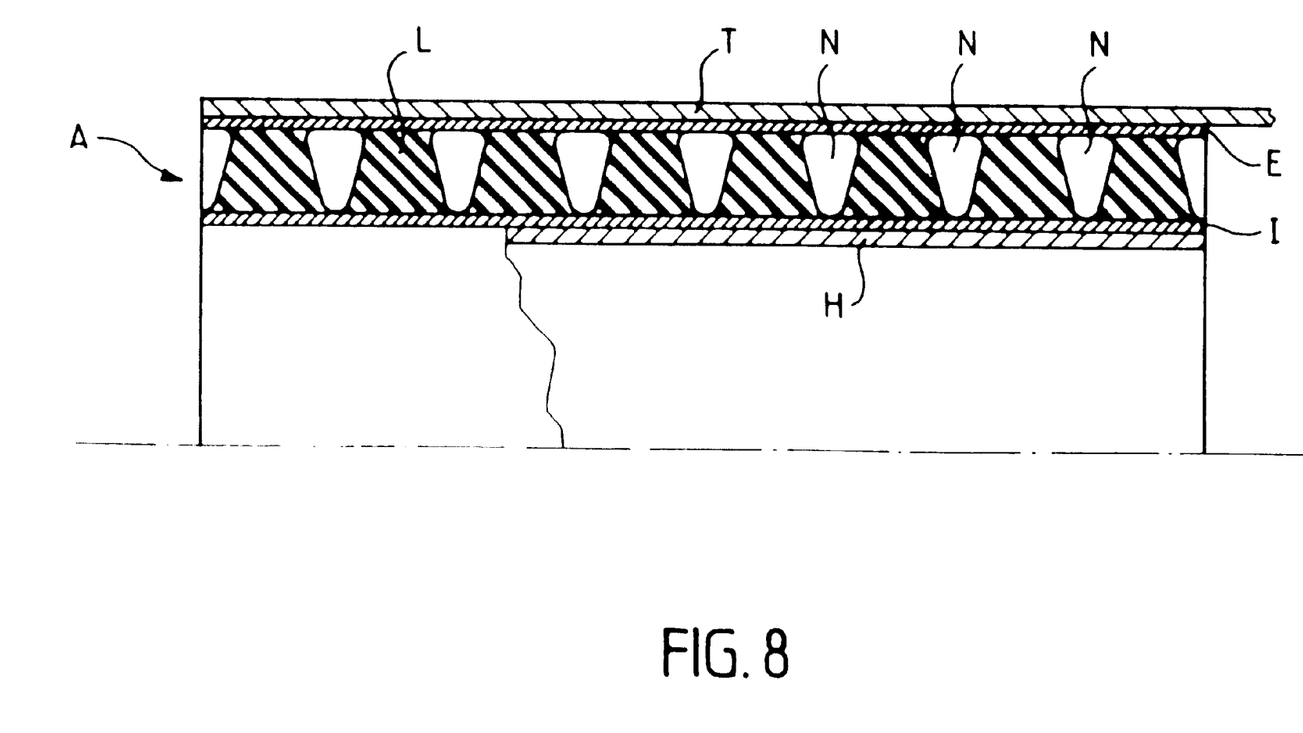
FIG. 8 is a vertical sectional half-view of an assembly according to the invention made in a single unit.

FIG. 8 depicts another embodiment of the invention and corresponds to FIG. 1.

Unlike the device in FIG. 1, the outer E and inner I shells do not consist of a side-by-side juxtaposition of basic elements 1a, 1b, etc., but consist of a one-piece cylindrical tube.

The elastomeric sleeve no longer consists of a juxtaposition of sleeve elements 4a, 4b, etc., but consists of a one-piece sleeve L.

A number of cells N with symmetry of revolution have been formed in this sleeve L.

These cells may extend over the entire circumference of the sleeve N or over just part thereof.

This one-piece design of the subshells E and I and of the sleeve N yields less flexibility for adjustment than the modular elements arrangement such as those of the first embodiment, but they are easier to install.

Figure 9:
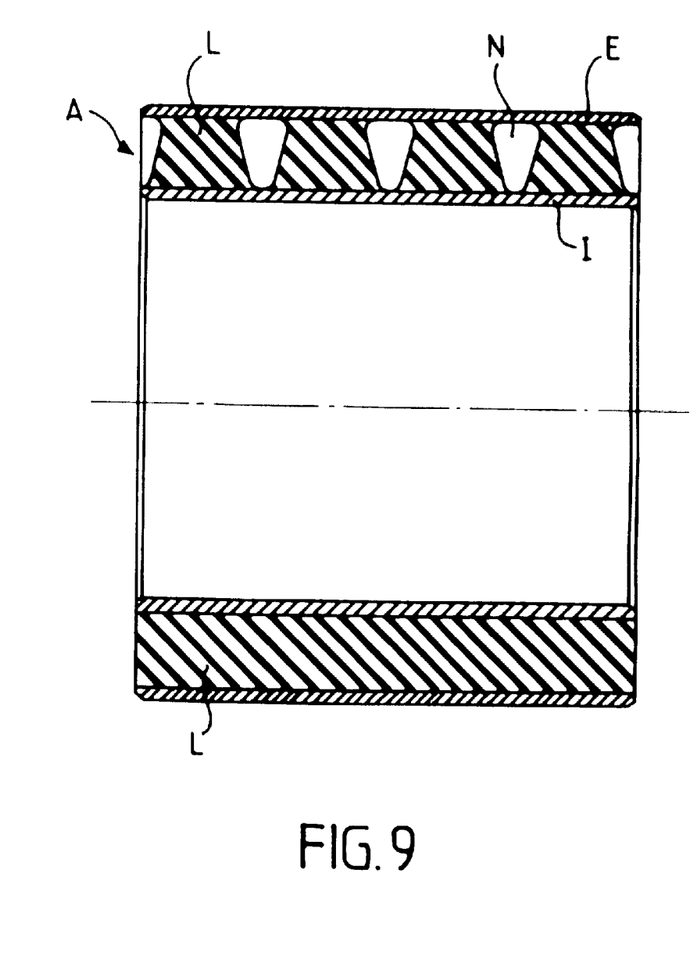
FIG. 9 is a sectional view along a broken line, of an alternative form of embodiment of an assembly made in a single unit.

It is also possible, without in any way departing from the invention, to combine the two embodiments by placing several one-piece elements such as those of FIGS. 8 and 9 side by side.

As depicted both in FIGS. 1 and 5 and in FIGS. 8 and 9, the cells N, whether formed by the juxtaposition of two concave portions or whether they are formed within the bulk of the sleeve L, have a generally trapezoidal cross section with rounded corners, the large base of the trapezium being connected to the tubular shell E, the small base of the trapezium being connected to the inner subshell I. The corners are rounded in such a way that, both in the case of FIGS. 1 to 5 and in that of FIGS. 8 and 9, there is no discontinuity within the bulk of elastomer L (or, in other words, in such a way that the metal is never visible either on the inside wall of the outer shell E or on the outside wall of the inner shell I).

In addition, the invention is not restricted to the case where the angle α is 70°, it being possible for this angle to vary from 20° to 160°.

I claim:

1. A suspension joint and torsion spring assembly, characterized in that it comprises an outer tubular shell, an inner tubular shell and an intermediate coupling sleeve made of elastomer, secured with no possibility to slide to the outer inner shells; said elastomeric sleeve comprising at least two cells extending along its circumference; wherein the cells are formed to allow the elastomer to deform freely so that the radial spring rate of the joint is significantly reduced in at least some directions without its torsional spring rate being significantly reduced.

2. An assembly according to claim 1, in which each cell may extend around all of the circumference of the sleeve.

3. An assembly according to claim 2, in which the sleeve comprises a number of cells arranged parallel to one another along the longitudinal axis of the joint.

4. An assembly according to claim 1, in which the outer and inner shells and the sleeve consist of a number of modular basic elements placed side by side.

5. An assembly according to claim 4, characterized in that it comprises at least two basic elements working in parallel, each basic element comprising an outer subshell, an inner subshell and an intermediate coupling sleeve made of elastomer, secured with no possibility to slide to the outer and inner subshells, at least one flank of which has a concave portion on at least part of its circumference, the basic elements being arranged end to end so that the outer shell and the inner shell are formed respectively by a succession of independent and adjacent subshells, while the concave portions of the flanks form at least one cell in the elastomer.

6. An assembly according to claim 5, characterized in that a concave portion is provided on each flank of the intermediate coupling sleeve made of elastomer.

7. An assembly according to claim 5, characterized in that the concave portion provided on one or each flank of the coupling sleeve extends along the entire circumference.

8. An assembly according to claim 5, characterized in that the concave portion provided on one or each flank of the coupling sleeve extends over just part of the circumference, and the successive basic elements have the same angular orientation so that the concave portions are side by side as are the continuous parts of the flanks.

9. An assembly according to claim 8, characterized in that there is a radial direction in which the radial spring rate is at a maximum, the radial spring rate being at a minimum in the direction perpendicular to the previous direction.

10. An assembly according to claim 5, characterized in that the outer subshell and the inner subshell of each basic element is made of metal and the intermediate coupling sleeve made of elastomer is bonded on its outside and on its inside to the outer subshell and to the inner subshell respectively.

11. An assembly according to claim 5, characterized in that it comprises one or more sets of four basic elements placed end to end.

12. An assembly according to claim 1, in which the cells are arranged in pairs, symmetrically with respect to the longitudinal axis of the suspension, so as to form two arcs of a circle, the angle of which can vary from 20° to 160°, which makes it possible to determine the amount of lessening of the radial spring rate as desired.

13. An assembly according to claim 1 in which the cells have a trapezoidal cross section with rounded corners, the large base of the trapezium being located on the outer shell and the small base on the inner shell.

14. An assembly according to claim 13 in which the rounded corners of the trapezium cross section are rounded in such a way that there is no discontinuity in the elastomer of the sleeve.

15. An assembly according to claim 13 in which the rounded corners of the trapezium cross section are rounded in such a way that the elastomer of the sleeve is in contact between juxtaposed elements.

16. An assembly according to claim 1, in which each cell may extend around part of the circumference of the sleeve.

17. An assembly according to claim 16, characterized in that there is a radial direction in which the radial spring rate is at a maximum, the radial spring rate being at a minimum in the direction perpendicular to the previous direction.

18. A suspension joint and torsion spring assembly for installation between a tubular crossbeam and a suspension arm comprising a tubular outer shell, a tubular inner shell, and an elastomeric coupling sleeve secured to said outer and said inner shell, wherein said coupling sleeve comprises at lest one flank having a concave portion on at least part of its circumference, further comprising a second elastomeric coupling sleeve, wherein said second coupling sleeve comprises at least one flank having a concave portion on at least part of its circumference, wherein a cell is formed partially around the circumference of said sleeves between said first and said second flank.

19. A suspension joint and torsion spring assembly for installation between a tubular crossbeam and a suspension arm comprising a first and second tubular outer shell, a first and second tubular inner shell, a first elastomeric coupling sleeve secured to said first outer shell, and a second elastomeric coupling sleeve secured to said second outer shell, wherein said first and said second coupling sleeves each comprise at least one flank having a concave portion on at least part of its circumference and wherein a cell is formed partially around the circumference of said sleeves by an alignment of said flanks.

20. A suspension joint and torsion spring assembly for installation between a tubular crossbeam and a suspension arm comprising a basic element comprising a tubular outer shell, a tubular inner shell, and an elastomeric coupling sleeve secured to said outer and said inner shell, wherein said coupling sleeve comprises at least one flank having a concave portion on at least part of its circumference, further comprising at least a second basic element, wherein said first and second basic elements are aligned side by side, wherein a cell is formed partially around the circumference of said sleeve between said flanks of said first and said second basic elements.

21. An assembly according to claim 18, wherein said cell has a trapezoidal cross section with rounded corners.

22. An assembly according to claim 19, wherein said cell has a trapezoidal cross section with rounded corners.

23. An assembly according to claim 20, wherein said cell has a trapezoidal cross section with rounded corners.

* * * * *

UNITED STATES PATENT AND TRADEMARK OFFICE
CERTIFICATE OF CORRECTION

PATENT NO. : 6,412,762 B2
DATED : May 23, 2003
INVENTOR(S) : Etienne de Fontenay It is certified that error appears in the above-identified patent and that said Letters Patent is hereby corrected as shown below:

<u>Title page,</u>
Item [73], Assignee, "Generale" should read -- Générale --; and "Micheline" should read "Michelin --

<u>Column 2,</u>
Line 57, "is" should read -- are --

<u>Column 3,</u>
Line 34, "unit;" should read -- unit; and --

<u>Column 7,</u>
Line 37, "inner" should read -- and inner --

<u>Column 8,</u>
Line 12, "is" should read -- are --
Line 48, "lest" should read -- least --

Signed and Sealed this

Twenty-sixth Day of August, 2003

JAMES E. ROGAN
*Director of the United States Patent and Trademark Office*